July 5, 1966   R. A. OLSEN   3,259,352
LOADING BALANCER ASSEMBLY
Filed June 22, 1965   2 Sheets-Sheet 2

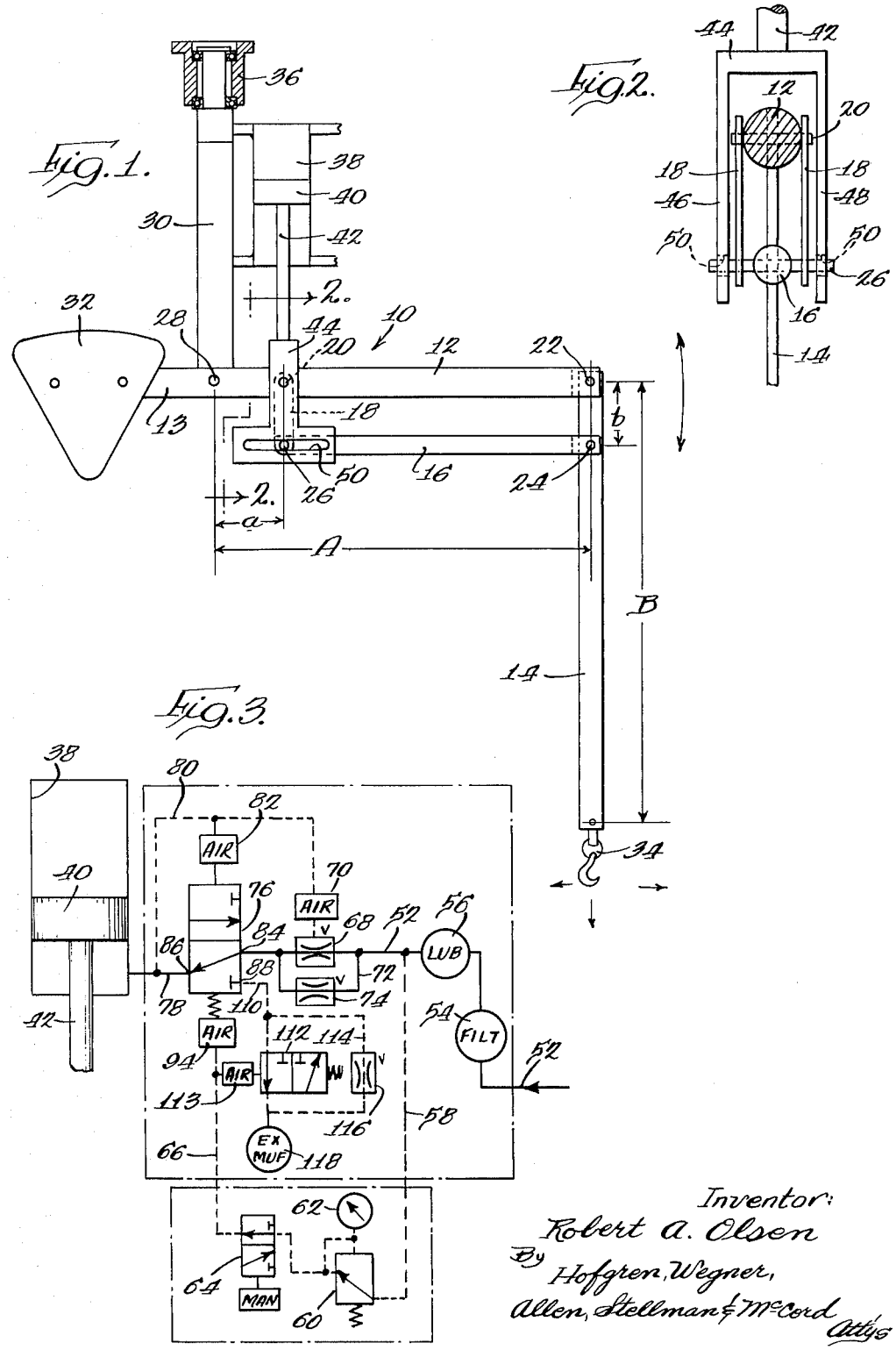

United States Patent Office 3,259,352
Patented July 5, 1966

3,259,352
LOADING BALANCER ASSEMBLY
Robert A. Olsen, Palatine, Ill., assignor to Conco Engineering Works, Inc., a corporation of Illinois
Filed June 22, 1965, Ser. No. 466,046
18 Claims. (Cl. 248—325)

This application is a continuation-in-part of my copending application Serial No. 444,890, filed March 8, 1965 which is a continuation-in-part of Robert A. Olsen application Serial No. 428,282, filed January 14, 1965, now abandoned, which is a continuation-in-part of application Serial No. 356,401, filed April 1, 1964, now abandoned.

This invention relates to load handling equipment and, more particularly, to a loading, positioning and balancing assembly or apparatus for assistance in the repetitive handling of workpieces, power tools, and the like.

In U.S. Patent No. 3,134,340, which was issued on May 26, 1964, to Robert A. Olsen and Milton R. Nielsen, there is described an apparatus which permits exact balancing of a load about three axes and which permits the load to be moved as desired with a slight, constant effort and positioned at any point within the effective coverage of the apparatus. The apparatus incorporates an assembly of four arms, pivotally connected and arranged to form a parallelogram, and a counterweight which is used to balance exactly a load attached to one of the arms. By suitable selection of the length of the arms of the parallelogram as well as the effective weight of the counterweight, the apparatus can be made to balance perfectly about each of three axes, thereby permitting effective movement of the load in any desired direction with merely the force required to overcome friction in the apparatus. In one of the embodiments of the apparatus disclosed in the Olsen et al patent, the apparatus is arranged to permit two operating modes, one in which no load is present and in which the apparatus is balanced for its own weight only, and another in which the apparatus is balanced to support a given load. Conversion from one mode of operation to the other is accomplished by moving a portion of the counterweight between two fixed positions, thereby varying the balancing force exerted by the counterweight. This embodiment permits effective hoisting and depositing of a work load in addition to balancing the load as desired within the effective range of the apparatus.

Although the "loading" embodiment disclosed in the Olsen et al patent is effective and satisfactory for many applications, it has been found to have some shortcomings when the nature of the work in which the balancer is used requires a high speed transfer from one mode of operation to the other. In such instances, the attempt to make this conversion by rapid shifting of the counterweight gives rise to undesirable inertial forces which are reflected back to the operator of the machine, particularly when the weights involved are substantial in size, and thereby limit the maximum rates at which loading and unloading can be carried out.

In my above cited copending application, there is disclosed an improvement on the balancer apparatus disclosed in the Olsen et al patent and which permits rapid transfer between the loaded and unloaded modes of operation without undesirable inertial effects. The transfer is accomplished by supplying an additional force to one arm of the four arm balancer assembly to compensate for the load which is added or removed and thereby to maintain an existing balanced condition. The force is applied by means having relatively little mass, such as a fluid actuated piston and cylinder, so that no substantial inertial effects are encountered in changing modes. While the fluid actuating system disclosed in said application performs excellently in most installations, it has been found that the load bearing arms can tend to move rapidly when the apparatus is set for relatively heavy loads, i.e. several hundred pounds, and the load is not secured to the arm when the apparatus is shifted to the loaded mode of operation. Such rapid movement when the device is used can be dangerous and a source of injury to an operator of the apparatus. Additionally, it has been found that with increased loads, the form of balancer linkage used therein has a tendency to deflect somewhat upon application of pressure thereto and therefore not balance accurately.

The present invention constitutes an improvement on the balancer apparatus disclosed in both said patent and said application by effectively eliminating such deflection or distortion of the balancer linkage and by pressurizing the fluid actuated piston with a fluid at a rate proportional to the load. These advantages are obtained by applying the balancing force at the pivotal connection between the ends of two of the arms constituting the parallelogram linkage and by utilizing a variable orifice valve in the cylinder pressurizing line, the degree of opening of the orifice being directly proportional to the pressure in the cylinder which, in turn, is directly proportional to the load supported by the balancer apparatus. Additionally, means are provided for operating a jaw type fluid-operated fixture, i.e. a mechanical gripper, which are integrated with the pressurized counterbalancing system in a manner to provide complete safety in operation thereof.

The invention will be better understood from the following detailed description thereof, taken in conjunction with the accompanying drawings in which:

FIG. 1 is a side elevation of a form of the invention with parts thereof shown in sections;

FIG. 2 is a vertical section on an enlarged scale taken approximately along the line 2—2 of FIG. 1;

FIG. 3 is a schematic illustration of a fluid actuated balancer control system;

Figure 4:
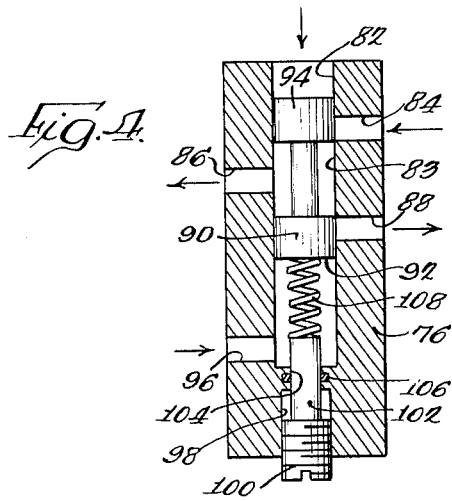
FIG. 4 is a sectional view of a valve used in the system of FIG. 3.

Turning to FIGS. 1 and 2, there is shown an exemplary form of the invention, generally designated 10. The balancer 10 includes four arms 12, 14, 16 and 18, pivotally connected as at 20, 22, 24, 26 to form a parallelogram linkage. The arm 12 includes a rearward extension 13 which is pivotally mounted as at 28 to a vertical support 30. Additionally, the rearward extension 13 supports a counterweight 32 which serves to partially balance the linkage in the "no-load" mode for all movement thereof wherein the arm 14 is maintained at a vertical attitude. The remainder of the balancing is obtained by pressure air in the "no-load" mode. The arm 14 includes at its lower extremity suitable means 34, such as a hook or mechanical hand, for supporting the load to be balanced.

The vertical support 30 is journalled in a kingpin 36 which may be secured to a suitable overhead support, not shown, and permits movement of the balancer 10 about a vertical axis. Mounted on the vertical support 30 for movement therewith about the vertical axis provided by the kingpin 36 is a fluid cylinder 38 having a piston 40. The system can be either pneumatic or fluid and a pneumatic system is described hereinafter. The piston 40 has a piston rod 42 which is connected to bifurcated yoke 44. The yoke 44 includes a pair of spaced downwardly extending arms 46 and 48, each generally shaped in the form of an inverted T. The horizontal portion of each of the T-shaped arms 46 and 48 includes an elongated horizontal slot 50 in which the pivot pin 26 interconnecting the arms 16 and 18 of the balancer 10 is received.

As will be apparent, the horizontal displacement between the point of support of the linkage 10, namely pivot 28, and the point of application of counterbalancing force exerted within the cylinder 38, namely pivot 26, is variable such that the cylinder 38 and piston 40 may exert a counterbalancing force on the linkage 10 for all positions of the arm 12. For example, when the load bearing arm 14 is swung away from the vertical attitude shown in FIG. 1, the parallelogram construction of the balancer 10 will cause the pivot 26 to be moved sideways to a point no longer directly underlying the point of application of force by the cylinder 38 and piston 40, but will nonetheless be subjected to such a counterbalancing force by virtue of its connection to the yoke 44 in the slots 50. Such movement of the pivot 26 within the slots 50 will cause slight movement of the piston 40 within the cylinder 38. As will be seen hereinafter, such movement of the piston 40 within the cylinder 38 causes a change of pressure within the latter which, in turn, will automatically cause the pressure exerted within the cylinder 38 to be readjusted to balance a load on the arm 14.

It will be appreciated by virtue of the parallelogram linkage construction of the balancer 10, that the ratio of the horizontal component of the distance between the pivot 28 and the pivot 26, and the horizontal component of the distance between the pivot 28 and the load in any position of the loads supporting arm 14 will remain constant. Since the weight of the load is, of course, constant, it will be apparent that for all positions of the load, the counterbalancing force exerted on the piston 40 should remain the same, the change in the length of the moment arm between the pivot 28 and the load being compensated by the proportional change in the length of the moment arm between the pivots 26 and 28, the former being the point of application of the counterbalancing force.

Turning now to FIG. 3, there is shown an exemplary form of a pneumatic control system for controlling the pressure exerted within the cylinder 38 against the piston 40 to provide the counterbalancing force. While the illustrated system is described as being pneumatic, those skilled in the art will readily recognize that it could be of a hydraulic character. The control system includes an air inlet line 52 connected to a suitable source of operating air under pressure. Included in the inlet line 52 is a suitable filter 54 and a lubricator 56. A line 58 branches from the line 52 and leads to a manually adjustable pressure setting valve 60 having a pressure indicating gauge 62. The outlet of the valve 60 extends to a manually operated 3-way toggle valve 64 which, in turn, is connected to a line 66. The toggle valve 64 is arranged to alternatively supply a line 66 with pressure regulated air from the valve 60 or to exhaust air under pressure from the line 66.

Line 52 additionally leads to a pilot operated variable orifice valve 68 having a pilot 70. The valve 68 is provided with a bypass line 72 which includes therein a manually operated variable orifice valve 74. The valves 68 and 74 serve to regulate the rate of application of counterbalancing pressure to the piston 40, the former in a manner proportional to the cylinder pressure while the latter permits passage of fluid in a constant manner. The outlets of both the valves 68 and 74 are connected to a double pilot operated 3-way spool valve 76. By means of a line 78, the spool valve 76 has an outlet connected to the cylinder 38 to direct air under pressure to the underside of the piston 40. The line 78 includes a branch 80 which is connected to a first pilot 82 of the spool valve 76 and to the pilot 70 of the variable orifice valve 68.

Turning now to FIG. 4, there is seen a more detailed view of the double pilot operated 3-way spool valve 76. The valve 76 includes a body having a central bore 83 having an inlet port 84 which is connected to the outlets of the valves 68 and 74. Additionally, the valve 76 includes an outlet 86 which is connected to the line 78 and an exhaust port 88 for connection to a portion of the system to be described hereinafter. A spool 90 is received within the bore 83 and includes piston-like surfaces 92 and 94 on its lower and upper ends respectively which are subjected to the pilot air to control movement of the spool 90 within the bore 83. The upper end of the bore 83 is indicated as 82 as it serves as the pilot 82. The lower end of the bore 83 serves as the second pilot and has a port 96 for admittance of the pilot air. On the lower end of the valve body there is provided a threaded bore 98 in which a headless adjusting screw 100 is received for adjustably balancing the system in the unloaded mode of operation. The adjusting screw 100 includes a cylindrical shaft 102 which projects through an aperture 104 in the valve body into the lower end 94 of the bore 83. Suitable sealing means 106 are provided within the aperture 104 to preclude the passage of air from the lower pilot into the threaded bore 98. Interposed between the end of the cylindrical shaft 102 and the lower piston-like surface 92 on the spool 90 is a compression spring 108. It will be immediately observed that the biasing effect on the spool 90 provided by the compression spring 108 and the lower pilot 94 is cumulative. Furthermore, the degree of bias provided by the compression spring 108 is adjustable by varying the position of the adjusting screw 100 within the threaded bore 98. The lower pilot 94 receives its pilot air from the manually operated pressure regulating valve 60 via manually operated valve 64 in line 66. Thus it will be apparent, that when the manually operated toggle valve 64 is set to exhaust the line 66, the pilot 94 will be exhausted and if there is pressure within the cylinder 38, the spool 90 will be forced downwardly to place the outlet port 86 and the exhaust port 88 in communication with each other to exhaust such pressurized air within the cylinder 38, except for the pressure air providing for "no-load" balancing.

The exhaust port 88 of the valve 76 is connected by a line 110 to a normally closed pilot operated valve 112. The valve 112 is arranged to be opened only so long as its pilot air is maintained and is provided with a bypass line 114 having an orifice 116. The outlets of the valve 112 and the orifice 116 are connected to a suitable exhaust muffler 118. The pilot 113 of the valve 112 is connected to receive its pilot air from the line 66. Thus, it will be apparent, that whenever line 66 is exhausted through the manually operated toggle valve 64, valve 112 will close and the cylinder 38 may only be exhausted through the orifice 116 in the bypass 114. By making the orifice 116 of a suitably small size, a rapid drop in pressure in the cylinder 38 is precluded. This construction serves as a safety feature in the event of loss of air pressure and precludes rapid lowering of the load supporting arm 14 when the manually operated valve 64 is shifted to terminate the application of the counterbalancing force by the piston 40 to the balancer 10.

The operation of the apparatus in the loaded mode is as follows: Regulated air under pressure is introduced into the pilots 94 and 113 of valves 76 and 112 respectively through the manually operated toggle valve 64 and the pressure regulator 60 from the inlet line 52. Upon the admission of pilot air to the pilot 94, the spool 90 in the valve 76 is forced upwardly to cause communication between the inlet port 84 and the outlet port 86. Air from the inlet line 52 is admitted to the inlet port 84 of the valve 76 initially through the orifice 74 in bypass line 72 due to the fact that the variable orifice valve 68 is closed by virtue of its lack of pilot air. Upon flowing of air under pressure through the valve 76 to the line 78 and the cylinder 38, pressure will build up within the latter if there is resistance to movement of the piston 40 due to the presence of a load on the arm 14. As a result of such pressure, the pilots 70 and 82 are subjected to air under pressure and the variable orifice valve 68 begins to open to permit increased flow of air under pressure to the cylinder 38.

In the event that there is no substantial resistance to the movement of the piston 40 within the cylinder 38 due to the lack of a load on the arm 14, the piston 40 will move upwardly within the cylinder 38 and thereby preclude the build-up of pressure within the latter. As a result of such movement, pilots 70 and 82 are not subjected to air at a significant pressure and accordingly, the variable orifice valve 68 will not open appreciably or will remain closed. Since the orifice 74 permits the flow of air under pressure to the line 78 at a relatively slow rate, it will be apparent that the piston 40, and thus the arm 14, will not move rapidly upwardly when the apparatus is shifted to the loaded mode of operation and there is no load secured to the arm 14. This construction serves as a safety feature to preclude dangerous rapid upward movement of the linkage 10.

Additionally, the air in the pilot 82 begins to exert downward force on the spool 90 of the valve 76. At some point, the upward pressure on the spool 90 exerted by the compression spring 108 and the lower pilot air is balanced by the upper pilot air to cause the spool 90 to assume the position shown in FIG. 4. At this point, air pressure within the cylinder 38 is maintained at a constant value as the spool 90 of the valve 76 precludes communication between the cylinder and either the inlet port 84 or the exhaust port 88. By regulating the pilot air pressure to the lower pilot 94 by means of the pressure regulating valve 60, the amount of air pressure exerted within the cylinder 38 is selected to exactly counterbalance the load supported on the arm 14 and the balancer 10. If the load is moved in counterclockwise direction about the pivot 28 as seen in FIG. 1, it will be appreciated that the piston 40 will be moved slightly upwardly within the cylinder 38 to thereby decrease the pressure exerted on its lower surface. This movement will also decrease the pressure exerted within the pilot 82 to permit the spool 90 to rise slightly within the bore 83 and re-establish communication between the inlet 84 and the cylinder 38. Shortly sufficient air will be admitted to the cylinder 38 to again raise the pressure therein to the preset value that is sufficient to balance the load. Simultaneously with this occurrence, the air pressure in the pilot 82 will be increased in equal amount to cause the spool 90 to be forced somewhat downwardly to again cut off communication between the inlet 80, the outlet 86 and the exhaust 88.

Should the load be moved clockwise about the pivot 28 as seen in FIG. 1, air pressure within the cylinder 38 will be slightly increased to increase the air pressure exerted in the pilot 82. This occurrence will cause the spool 90 to be forced downwardly somewhat from the position shown in FIG. 4 to establish communication between the cylinder 38 and the exhaust 88. Since the pilot 113 for the valve 112 is still subjected to pilot air from the line 66, pressure within the cylinder 38 will be relieved through the line 78, the outlet 86, the exhaust 88, line 110, the valve 112 and the exhaust muffler 118. Such pressure relief also causes a drop of pressure within the pilot 82 thereby permitting the spool 90 to once again assume the position within the bore 83 of the valve 76 shown in FIG. 4.

Upon deenergizing the device, or upon accidental loss of air pressure, the air in pilots 94 and 113 will be exhausted. The exhausting of the air within the pilot 94 permits the spool 90 of the valve 76 to shift downwardly to establish communication between the cylinder 38 and the exhaust 88. The absence of pilot air in the pilot 113 for the valve 112 causes the latter to close to thereby establish but a single path for the exhausting of the cylinder 38. This path, as noted above, is through the small fixed orifice 116. Because of the small size of the orifice 116, the pressure in the cylinder 38 will not drop rapidly, but rather, rather slowly to permit the load on the balancer 10 to slowly descend. This construction serves as a safety feature to preclude a rapid dangerous descent of the load.

In the unloaded mode of operation the position of the spool 90 of the valve 76 is controlled by the setting of the adjustment screw 100 and the upper pilot 82. The biasing influence of the lower pilot 94 is eliminated by the positioning of the manually operated three-way toggle valve 64. Other than the elimination of this third source of spool bias, the operation is identical to that in the loaded mode.

Figure 5:
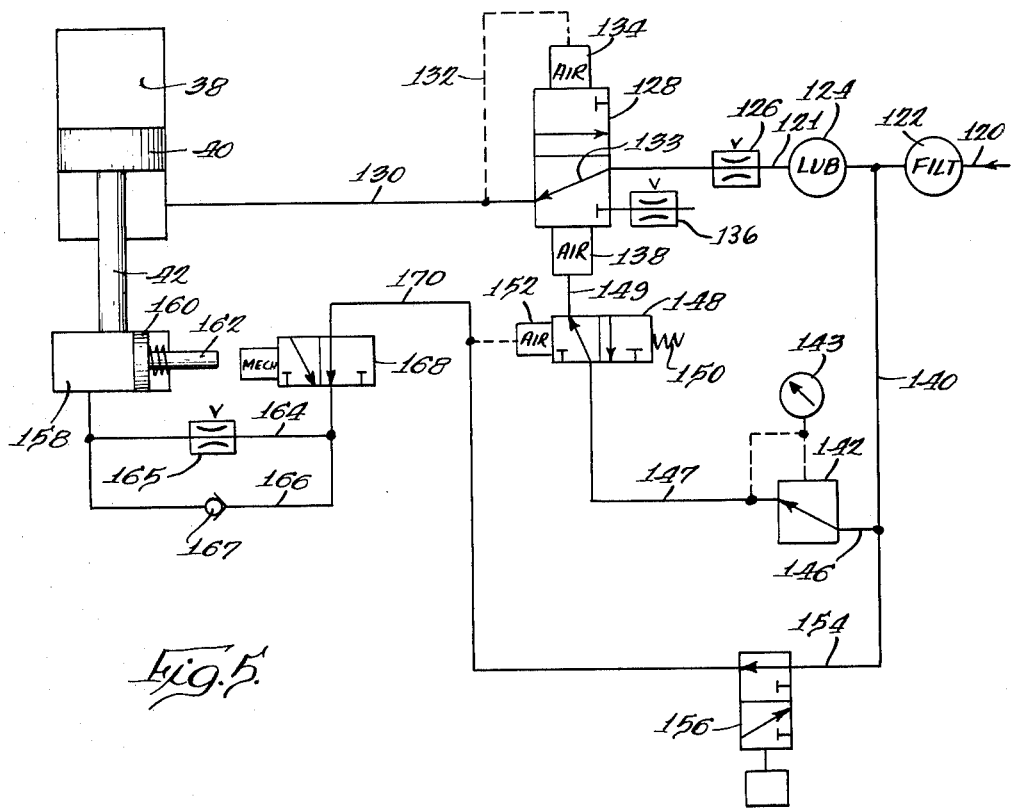
FIG. 5 is a modified form of a fluid actuated control system for a balancer and including means for operating a fluid actuated fixture in conjunction therewith.

Turning now to FIG. 5, there is seen another form of the invention wherein means are provided for operating a pneumatic fixture or a mechanical hand. There is provided an air inlet 120 which is adapted to be connected to a suitable source of air under pressure. The filter 122 is located in the line 120. A pressure regulating cylinder 128, in the form of a 3-way spool valve, is connected to the line 120 by means of a line 121 including a lubricator 124. A line 140 branches off the supply line 120 and connects with a line 146 leading to a manually adjustable pressure setting valve 142 having a pressure indicating gauge 143. The outlet side of the valve 142 is connected by a line 147 to a pilot actuated 3-way valve 148 with the valve 148 having an outlet connected by a line 149 to a pilot 138 of the pressure regulating valve 128. A second line 154 connects to the line 140 and extends to the pilot 152 of the 3-way valve 148 to provide pressure there for the pilot operation. The line 154 has a manually operated 3-way toggle valve 156 connected therein.

The outlet side of the pressure regulating valve 128 is connected by a line 130 to the cylinder 38 at the bottom thereof for supplying pressure air to the cylinder beneath the piston. This line has a branch line 132 placing the bottom of the cylinder in communication with a pilot 134 on the pressure regulating valve 128.

The circuit, as shown, is in a pressurized condition for handling a load, with the pressure condition existing in the lower end of the cylinder 38. This pressure condition exists because the lower side of the cylinder is connected to supply line 120 through the line 121, the passage 133 in the regulating valve 128 and the line 130. The pressure is determined by the setting of the pressure valve 142 which supplies fluid through the valve 148 to the pilot 138 of the valve spool of the valve 128 as shown in FIG. 5 and urges the valve to open position. When a desired pressure condition in the cylinder is reached, the balancing pressure branch line 132 acts upon the opposite end of the spool valve 128 to obtain the balance condition. In the event that the balancer assembly is raised with result that the piston 40 moves up in the cylinder 38, the pressure in line 132 decreases. The pressure acting through the valve 148, which is constant, thereby shifts the valve 128 to supply additional pressure to the underside of the cylinder 38. To change the circuit from the load condition, the toggle valve 156 is moved from the position illustrated with the result that pilot air is removed from the pilot 152 of the 3-way valve 148 by being exhausted to atmosphere through the toggle valve 156. This results in a spring 150 of valve 148 shifting the valve to disconnect the air supply to the pilot 138 of the regulating valve 128, with the result that pressure existing in the cylinder causes the valve 128 to shift and the fluid discharges through an adjustable needle valve 136.

When the force is again to be established by activation of the system, the toggle valve 156 is shifted to the position shown in FIG. 5 to supply air to the pilot 152 of the 3-way valve 148. This establishes the circuit through lines 146 and 147 to the pressure regulating valve 128 and the pressure builds up within the pilot 138 until a balancing pressure is obtained on opposite ends of the spool in valve 128.

To control the rate of applying pressure to the cylinder 38, an adjustable needle valve 126 is placed in line 121. By means of appropriate regulation of the needle valves 126 and 136, the system can be made to preclude rapid movement of the load in any direction.

The portion of the control for operating a pneumatic fixture or mechanical hand is as follows. Included as part of the control is a pneumatic cylinder 158 having a piston 160 and a piston rod 162 which serves to actuate a conventional mechanical hand or pneumatic work gripping fixture by any well known mechanical means. The cylinder 158 is connected by a pair of parallel lines 164 and 166 to a mechanically actuated 3-way valve 168. The line 164 includes therein an adjustable needle valve 165 for regulating the rate of exhaustion of the cylinder 158 while the line 166 includes a check valve 167 permitting air to flow through the line 166 to the cylinder but not the reverse.

The 3-way valve 168 is connected by a line 170 to the pilot 152 of the 3-way valve 148 and the manually operated toggle valve 156. Additionally, the 3-way valve 168 is normally arranged to permit fluid communication between the line 170 and the cylinder 158. However, upon actuation of the valve 168, it is arranged to port line 170 to the atmosphere. The actuator for the valve 168 is arranged in conjunction with the jaws of the mechanical hand or the connecting rod 162 such that over-travel thereof due to failing of the pneumatic fixture or mechanical hand to strongly grip the load to be balanced will cause the valve 168 to be actuated to port the line 170 to the atmosphere.

Additionally the spring 150 associated with the 3-way valve 148 is made sufficiently strong such that sufficient pressure must be exerted in line 170 to cause secure gripping of the load to be balanced by the pneumatic fixture due to its connection with the piston 160 in the cylinder 158 before the valve 138 will permit the admission of regulated air under pressure to the pilot 138 to permit application of the balancing force. As a result of this construction, it will be observed that the apparatus can never attain the loaded mode of operation until the load is strongly gripped as the failure to grip will cause the connecting rod 162 to over-travel to actuate valve 168 and ultimately cause a lack of pilot pressure in the pilot 152 of the valve 148. Thus, the valve 148 cannot cycle to the loaded mode of operation before sufficient pressure is present in the cylinder 158 to securely close the jaws of the pneumatic fixture upon the load as such a condition is precluded by proper selection of the spring 150.

As in the case of the control system schematically shown in FIG. 3, the above control system has been described as being of a pneumatic character. However, it will again be apparent to those skilled in the art that the character of system could be changed to a hydraulic type without departing from the spirit of the invention.

Having set forth specific embodiments of my invention as required by 35 U.S.C. 112, I do not wish to be limited to the exact construction set forth, but rather, to have my invention construed broadly in accordance with the true spirit as set forth in the following claims.

I claim:

1. A loading balancer assembly comprising, a frame, a first arm pivotally mounted on said frame for pivoting about a first axis, a second arm pivoted to said first arm for pivoting about a second axis, a fluid circuit for applying force to said first arm for balancing including a piston and cylinder operatively connected to said first arm, valve means in said circuit for supplying operating fluid under pressure to said cylinder, a first flow restricting orifice in said circuit for establishing a maximum fluid flow, a second variable orifice in parallel with said first orifice, and means responsive to the load carred by said assembly for setting said second orifice.

2. A loading balancer assembly comprising, a frame, a first arm pivotally mounted on said frame for pivoting about a first axis, a second arm pivoted to said first arm for pivoting about a second axis, a fluid circuit for applying force to said first arm for balancing including a piston and cylinder operatively connected to said first arm, valve means in said circuit for selectively applying operating fluid under pressure to said cylinder, an exhaust line in said circuit including a flow restricting orifice through which fluid exhausts from said cylinder upon failure of the operating fluid supply, and means for bypassing said orifice during normal operation.

3. A loading balancer assembly comprising, a frame, a first arm pivotally mounted on said frame for pivoting about a first axis, a second arm pivoted to said first arm for pivoting about a second axis, a fluid circuit for applying force to said first arm for balancing including a piston and cylinder operatively connected to said first arm, valve means in said circuit for selectively applying operating fluid under pressure against said piston, said valve means including means responsive to the operating pressure existing in the cylinder in opposition to a control pressure for controlling the supply of operating fluid to said piston, and spring means acting on said valve means to set up a minimum control pressure and a minimum balancing force.

4. A loading balancer assembly comprising a generally horizontal first arm mounted for pivotal movement about a horizontal axis; a generally vertical second arm adapted to receive a load to be hoisted and balanced by said assembly, said second arm being pivotally connected to said first arm; a power mechanism including a piston and cylinder operatively connected to said first arm for applying an elevating force to said first arm; means for setting the amount of force applied by said piston and cylinder; means for maintaining said force constant in all positions of said second arm; and means for regulating the rate of admission of fluid under pressure to said cylinder in a manner proportional to the load of said arm to thereby provide a safe operating condition for said assembly.

5. The invention of claim 4 further including means for normally permitting at least partial free exhausting of said cylinder to decrease the force therein when said force exceeds a predetermined value and means responsive to deactuation of said assembly for rendering said free exhausting means ineffective.

6. The invention of claim 4 further including means normally permitting at least partial free exhausting of said cylinder to decrease the force therein upon said force exceeding a predetermined amount and means responsive to loss of fluid pressure for rendering said free exhaust means ineffective.

7. The invention of claim 5 further including means for gradually exhausting said cylinder upon operation of said last named means.

8. The invention of claim 6 further including means for gradually exhausting said cylinder upon operation of said last named means.

9. A loading balancer assembly comprising a generally horizontal first arm, means mounting said first arm for pivotal movement about a horizontal axis, a generally vertical second arm adapted to receive a load to be hoisted and balanced by said assembly and pivotally connected to said first arm; a generally horizontal third arm pivotally connected to said second arm; a generally vertical fourth arm pivotally connected to said first arm between said second arm and said mounting means; means pivotally interconnecting said fourth arm to said third arm at a predetermined location to form in conjunction with said first and second arms a parallelogram linkage; and power means for applying an elevating force to said parallelogram linkage substantially at said predetermined location.

10. The invention of claim 9 further including means for setting the amount of force applied by said power means; and means for maintaining said force substantially constant in all positions of said second arm.

11. The invention of claim 10 wherein said power means comprises a piston and cylinder; said constant force means includes means for applying fluid under pressure against said piston; and means responsive to a load on said second arm for regulating the rate of application of fluid under pressure against said piston.

12. A loading balancer assembly comprising a generally horizontal first arm mounted for pivotal movement about a horizontal axis; a generally vertical second arm adapted to receive a load to be hoisted and balanced by said assemblies, said second arm being pivotally connected to said first arm; a power mechanism including a piston and cylinder operatively connected to said first arm for applying an elevating force to said first arm; means for setting the amount of force applied by said piston and cylinder; means for maintaining said force constant in all positions of said second arm; and means for regulating the rate of admission of fluid under pressure to said cylinder in a manner substantially directly proportional to the force applied to said arm.

13. The invention of claim 12 wherein said setting means comprises first means for regulating the amount of force applied when said balancer is in an unloaded condition and second means for regulating the amount of force applied when said balancer is in a loaded condition.

14. The invention of claim 13 wherein said first means are continuously operable during said unloaded condition to balance said assembly.

15. The invention of claim 13 further including a counterweight on said first arm to balance said assembly in said unloaded condition in conjunction with said power mechanism and said first means.

16. A loading balancer assembly comprising a generally horizontal first arm mounted for pivotal movement on a horizontal axis; a generally vertical second arm adapted to receive a load to be balanced by said assembly, said second arm being pivotally connected to said first arm; a power mechanism operatively connected to said first arm for applying an elevating force to said first arm; means for setting the amount of force applied by the power mechanism, means for maintaining said force constant in all positions of said second arm; means for moving a work gripping fixture to grip a load; and means responsive to the gripping of a load for actuating said power mechanism.

17. The invention of claim 16 further including means responsive to overtravel of said moving means when no load is present for precluding application of said elevating force by said power mechanism.

18. The invention of claim 17 further including means for precluding release of a work gripping fixture gripping a load prior to de-energization of said power mechanism.

References Cited by the Examiner

UNITED STATES PATENTS

| | | | |
|---|---|---|---|
| 1,430,714 | 10/1922 | Wyatt | 214—130 |
| 1,843,968 | 2/1932 | Bellows | 254—10 |
| 3,014,494 | 12/1961 | Scott et al. | 137—561 |

CLAUDE A. LE ROY, *Primary Examiner.*

R. P. SEITTER, *Assistant Examiner.*